No. 661,004. Patented Oct. 30, 1900.
O. R. VAN VECHTEN.
OVERSEAMING SEWING MACHINE.
(Application filed Oct. 10, 1900.)

(No Model.) 5 Sheets—Sheet 1.

Fig. 1.

No. 661,004. Patented Oct. 30, 1900.
O. R. VAN VECHTEN.
OVERSEAMING SEWING MACHINE.
(Application filed Oct. 10, 1900.)

(No Model.) 5 Sheets—Sheet 3.

No. 661,004. Patented Oct. 30, 1900.
O. R. VAN VECHTEN.
OVERSEAMING SEWING MACHINE.
(Application filed Oct. 10, 1900.)

(No Model.) 5 Sheets—Sheet 4.

No. 661,004. Patented Oct. 30, 1900.
O. R. VAN VECHTEN.
OVERSEAMING SEWING MACHINE.
(Application filed Oct. 10, 1900.)
(No Model.) 5 Sheets—Sheet 5.

Attest:
E. G. Mason
Geo. M. Chapman

Inventor:
Orville R. Van Vechten
by Philipp, Sawyer, Rice & Kennedy
Attys

UNITED STATES PATENT OFFICE.

ORVILLE R. VAN VECHTEN, OF NEW YORK, N. Y.

OVERSEAMING SEWING-MACHINE.

SPECIFICATION forming part of Letters Patent No. 661,004, dated October 30, 1900.

Original application filed November 21, 1898, Serial No. 696,983. Divided and this application filed October 10, 1900. Serial No. 32,583. (No model.)

*To all whom it may concern:*

Be it known that I, ORVILLE R. VAN VECHTEN, a citizen of the United States, residing at New York, county of New York, and State of New York, have invented certain new and useful Improvements in Sewing-Machines, fully described and represented in the following specification and the accompanying drawings, forming a part of the same.

This invention relates to certain improvements in sewing-machines and is a division of application Serial No. 696,983, filed November 21, 1898.

In certain kinds of work, more especially in such work as sewing sweat-leathers in hats, in securing the upturned bottoms of trousers in position, and in sewing down the hem on the tops of stockings, and other similar work, the market demands that the work be done by blind stitch—that is, a stitch which does not show on the outside of the goods. Machines have been commercially used for some classes of the work specified above—for instance, in sewing the sweat-leathers in hats—which accomplished this result by using what is ordinarily known as a "through-and-through" stitch. Such a stitch is, however, objectionable in hat-sweat work not only on account of the appearance of the stitch, but also because the perspiration follows the line of thread through the holes made by the needle and discolors the hat-band. Such machines are, furthermore, not at all adapted for such work as sewing upturned bottoms of trousers or for any work for which a blind stitch is demanded by the market. Attempts have been made to produce blind-stitching machines for such purposes as those named above, and a few such machines are now commercially used. So far as known to me, however, such machines are complicated in construction and their sphere of practical usefulness is limited to some one particular line of work or to work on some particular style of goods. The complicated nature of these machines renders them expensive to construct, and they are, furthermore, exceedingly liable to get out of order.

It is the object of this invention to produce a machine which while it is primarily intended for blind-stitching shall be capable of use for various kinds of work and on various styles of goods—such as sewing in hat-sweats, sewing trousers-bottoms, knit goods, and other work of this class where the market demands a blind stitch—and which shall also be capable of use for other kinds of work—such, for instance, as overseam through-and-through stitching, making what is generally known in the art as "butting-work," and in general to produce a machine which is characterized by simplicity of construction and positive action in operation and which has a far wider field of usefulness than machines heretofore commercially employed and at the same time is inexpensive to build and is not liable to get out of order.

With these and other objects in view the invention consists in certain parts, improvements, and combinations, as will be hereinafter described, and particularly pointed out in the claims hereunto appended.

In the accompanying drawings, which constitute a part of this specification, and in which similar numerals of reference indicate similar parts, Fig. 6ª is a sectional detail taken on the line 6ª of Fig. 6.

In the machine which has been selected as illustrating the preferred embodiment of the invention the frame 1 is of the usual form, having an overhanging arm and the usual spool-support 2. The front end of the arm has forwardly-projecting guide-lugs 4, and mounted between these guide-lugs 4 is a movable frame or carrier 5. This frame or carrier is preferably provided with guiding-rods 6, which are secured thereto, these rods finding their upper bearing in a cross-piece 7 of the carrier and their lower bearing in a similar cross-piece 8. The rods pass through perforations in guide-lugs 4, which perforations form guiding-bearings. The frame or carrier 5 serves to support the stitch-forming mechanism, which will be hereinafter specifically described, and the frame or carrier is given a reciprocation, preferably by the following means:

Located in the overhanging hollow arm of the frame is a lever 9, which is fulcrumed on a pin 10, which pin passes through one of a series of holes 11 in the lever and a similar series of holes in the frame and finds its inner bearing in one of a similar series of holes in a pair of blocks 11' on the inside of the frame. The lever is connected at one end to the frame or carrier 5 by means of a pin 22, passing through eyes in projecting lugs 13 of the carrier. The connection between the pin 12 and the lever 9 is sufficiently loose to permit the vertically-reciprocating movement of the carrier. The opposite end of the lever 9 has a stud 14, (shown in dotted lines in Fig. 4,) which is preferably in the form of a friction-roll, and this stud engages in a groove in a closed or island cam 15. This cam 15 is carried on a shaft 16, which finds its bearing in the outer sides of the frame 1. The shaft 16 is provided with a gear-wheel 17, which meshes with a gear 18 on the driving-shaft 19, said shaft carrying the driving-pulley 20, by which power is applied to the machine. It will be understood that as the shaft 19 revolves the carrier 5 is reciprocated vertically, the number of said reciprocations with respect to the number of revolutions of the main shaft being determined by the relation of the gears 17 and 18. The amount of reciprocation of the carrier 5 is determined by the position of the fulcrum-pin 10. As has been before stated, the lever 9 is provided with a series of holes 11, the overhanging arm of the carrier having a series of holes corresponding in number to the holes 11.

Figure 4:
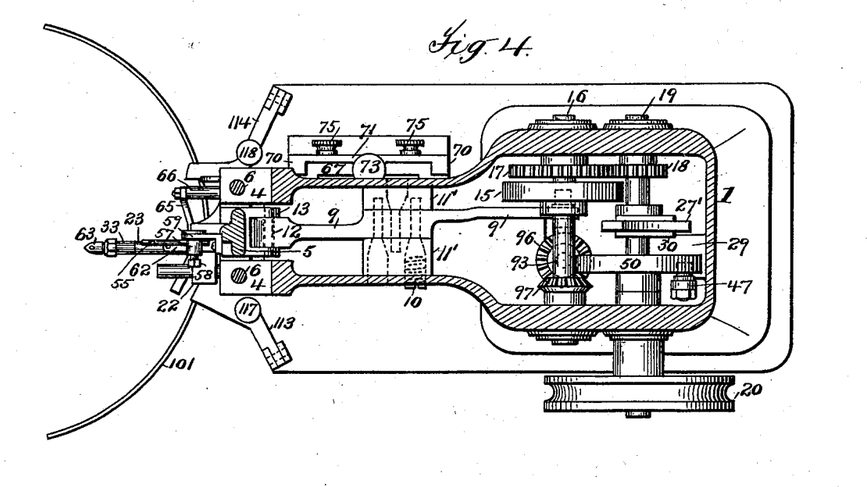
Figs. 4 and 5 are sectional plan views taken on the lines 4 4 and 5 5, respectively, of Fig. 1.
Figure 5:
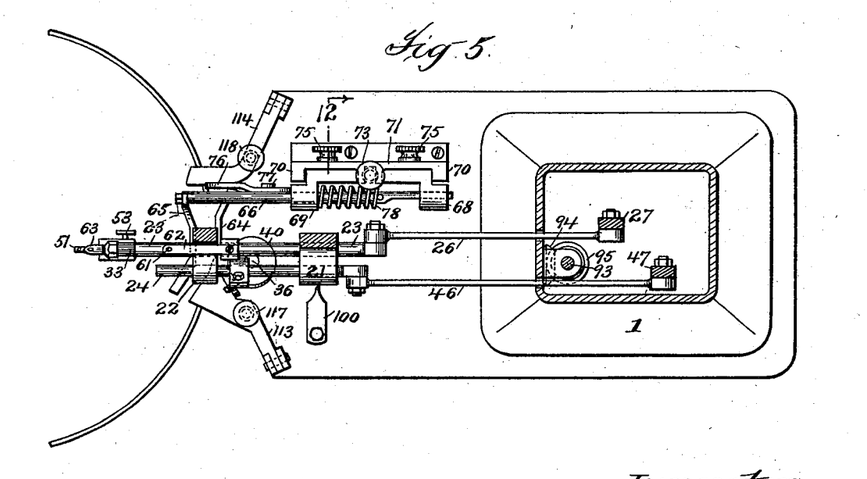

Referring to Fig. 4, in which the position of the pin is shown partly in full and partly in dotted lines and the adjustments of the pin are shown in dotted lines, it will be seen that the pin 10 does not extend through the frame from side to side and that the holes in the frame are arranged partly on one side of the frame and partly on the other. In the present instance one of the blocks 11' has one end bearing hole and the other block two such holes, and the frame has two holes on one side and one on the other. It is of course obvious that the holes might be arranged on one side of the frame or might pass through the frame from side to side. The present construction is preferable, however, because by it I am enabled to get a fine adjustment for the pin and at the same time avoid making the holes in the frame so close together as to increase the liability of breaking out the web between them. It will be noted that by this construction I am enabled to obtain a fine adjustment for the pin, and therefore a fine adjustment in the amount of movement of the carrier-frame 5, and to do this with great rapidity. In practice the adjustments required for the carrier-frame are as fine as one thirty-second of an inch.

In constructions which have been heretofore used, so far as known to me, the frame has been reciprocated by a cam located in the forward part of the overhanging arm. In order to obtain adjustment of the reciprocation of the carrier with a machine thus constructed, it is necessary to change the cam. This is a slow process and requires not only considerable dismembering of the machine, but also the services of an expert workman, whereas with the present form of adjustment a comparatively unskilled operator is able to make the necessary adjustment rapidly and without difficulty.

The carrier-frame 5 is provided with downwardly-projecting brackets 21 22, which are preferably cast in one piece with the carrier-frame. These brackets are perforated to provide bearings for the needle-bar 23 and the looper-operating bar 24, and the bracket 21 is also provided with a bearing 25 for the looper-shaft. The needle-bar is given its reciprocation by mechanism which will now be described.

Figure 1:
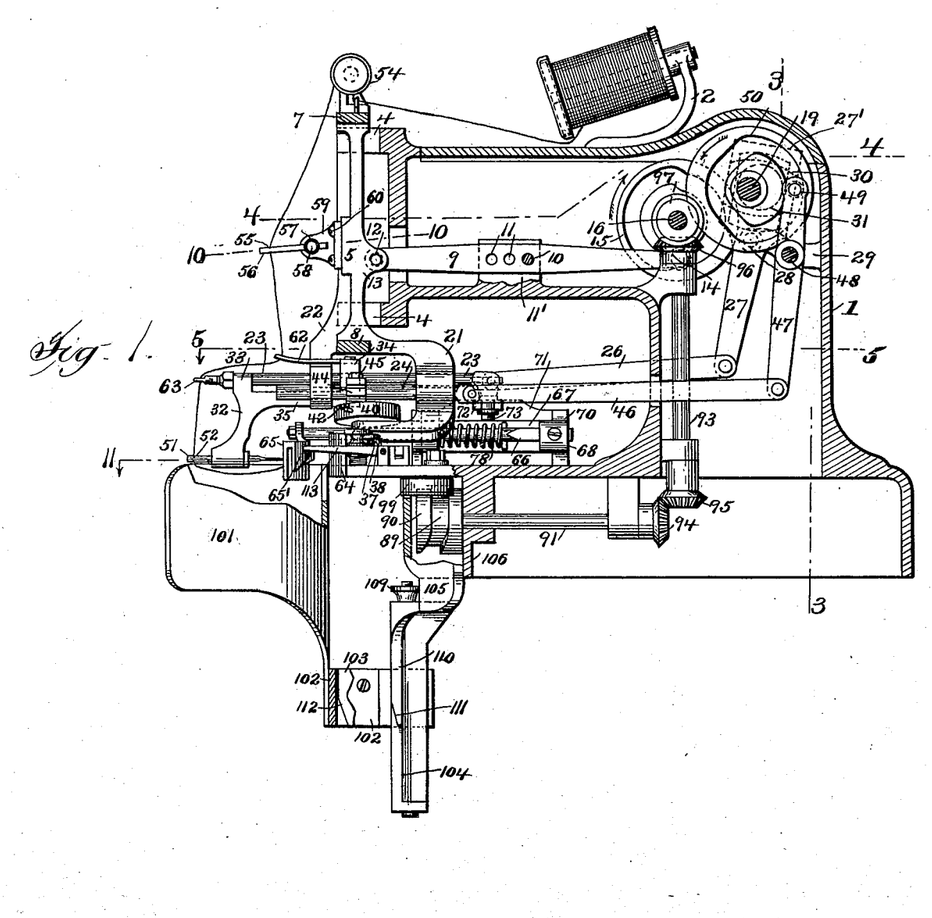
Figure 1 is a vertical section taken through a machine embodying the invention, the plane of section being taken on the line 1 1 of Fig. 2.
Figure 2:
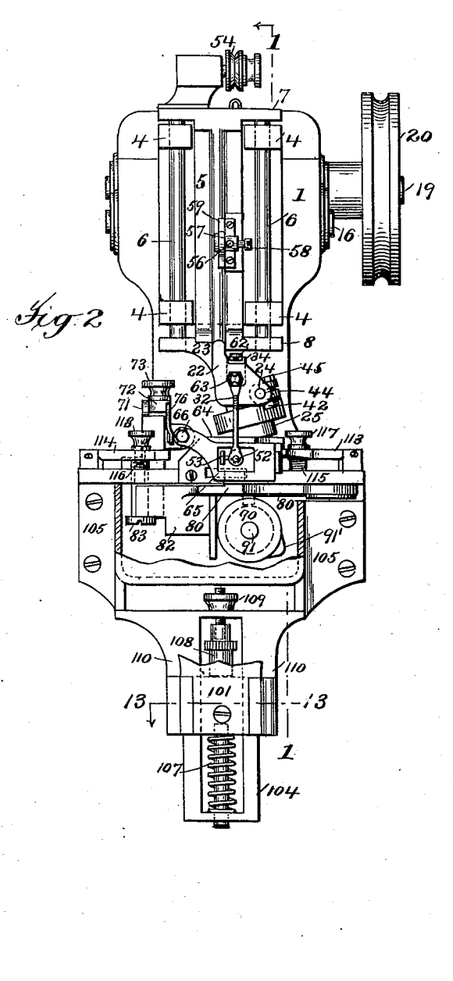
Fig. 2 is a front view of the machine shown in Fig. 1.

Connected to the needle-bar 23 is one end of a link or connecting-rod 26, the other end of which is secured to the lever 27, which in the present machine is located in the hollow vertical portion of the frame. This lever 27 is pivoted on a stud or pin 28, which has its bearing in one side of the frame and its other end in a piece 29, projecting from the inside of the frame. The connection between the lever and pins is preferably tapered in order that a ready adjustment for wear may be made. The upper end of the lever 27 is formed into a yoke 27', which yoke embraces and forms bearings for a sliding block 30, which embraces an eccentric 31, these parts being shown in dotted lines in Fig. 1 and partly shown in plan in Fig. 4. The eccentric is mounted on the main shaft 19. The needle-bar carries a bracket the downwardly-projecting arm 32 of which serves to support the needle. This bracket has upwardly-extending perforated projections 33 34, which embrace the needle-bar, and a longitudinal body portion 35, which is guided in a slot in the under side of the bracket 22, this construction being shown in Fig. 1. The longitudinal body portion 35, in connection with the slot in the bracket, serves to guide the needle-bar in its movements and to insure it against turning.

It is very important in this class of machines to provide for exactness of movement of the needle-bar not only to cause the needle to come truly into position to present its loops to the looper, but also to prevent the needle from striking the guides or any of the other closely-positioned working parts, and thereby being broken or sprung to such a degree that the looper will not readily take the loop. It will be noted that the construction just described enables me to use a straight needle having a movement in a right line, as distinguished from constructions which have heretofore been employed in which the needle is a curved needle and reciprocates in the arc of a circle. The great advantage resulting from the use of a straight needle will become apparent when the two modes of operation are compared. With a curved needle, in which it is necessary to place the eye on the side, the eye being at right angles to the curve, the loop is thrown out on the side. In order to successfully take such a loop, the looper must revolve around a horizontal axis and the loop must be taken from the curved needle practically at the point of intersection of its arc with the arc of travel of the looper. The parts must, therefore, be timed with great exactness, so that the curved needle may meet the loop at the precise point of intersection of the two arcs, and should the needle be sprung or bent the curved needle would fail to take the loop. By using a straight needle the looper may be mounted on an axis which is nearly vertical, the needle reciprocating in a line which is secant to the arc in which the looper travels. By this arrangement a longer run of the needle is secured with respect to the looper and the looper is given much more time in which to take the loop. Practically considered, it is found that with a curved needle the variation of the loop-taking point cannot much exceed one one-hundredths of an inch, whereas with a straight needle the variation may in extreme cases rise to about an eighth of an inch. Furthermore, as machines of this general class use what is known in the art as a "chain-stitch," with a curved needle, as much exactness is necessary when the looper is delivering its loop to the needle in making the second part of the stitch as when the needle is delivering its loop to the looper in making the first part of the stitch. Again, when the stitch is being drawn tight the strain on a curved needle is directly across its curve, and any considerable pull on the thread such as is necessary to make a tight stitch on heavy work will bend or spring the needle, and this fact has militated against the use of curved-needle machines, especially on the finer grades of work. With a straight needle the strain in drawing the stitch tight is lengthwise of the needle, and consequently as much strain can be exerted on the thread in drawing up the stitch as is necessary to make a workmanlike job.

Figure 3:
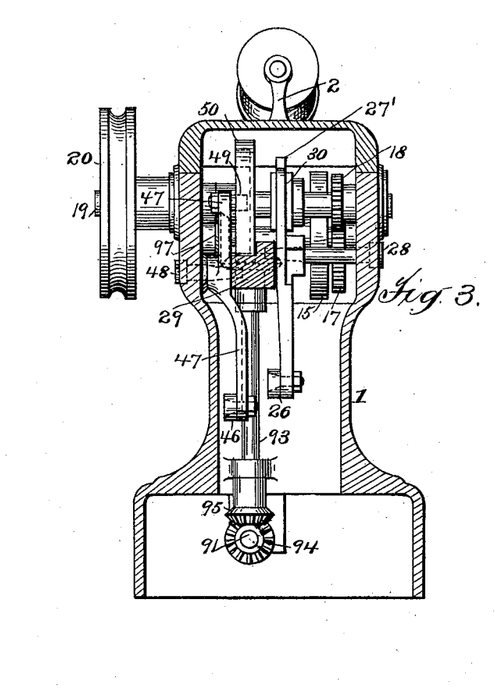
Fig. 3 is a section taken on the line 3 3 of Fig. 1 looking in the direction of the arrow.

The bracket 21 is inclined at a slight angle to the horizontal and has a perforation through it in which is mounted the looper-shaft 36, carrying the curved looper 37, which is or may be of any usual construction. The looper is mounted in a block 38, which is carried on the shaft 36, being adjustably secured in the block by means of a set-screw 39. The upper end of the shaft is provided with a circular plate or disk 40, which has a radial groove 41, in which plays a sliding block 42. This block is engaged by a pin 43, which depends from the clamp-block 44, which is secured on the looper-operating bar 24. This clamp-block is preferably made adjustable on the bar, being secured in position in a well-known manner by means of a set-screw 45. The inner end of the looper-operating bar 24 is secured to a connecting rod or link 46, which rod has its inner end pinned to a lever 47. This lever 47 is mounted on a pin 48, which passes through the boss 29. (See Figs. 1 and 3.) The upper end of the lever 47 is provided with a stud 49, which is preferably in the form of a friction-roll, and this stud engages with a groove in a closed cam 50, mounted on the main shaft 19. It will be understood that as the main shaft revolves the looper-bar 24 is given longitudinal reciprocation and through the pin 43 and the sliding block 42 imparts a rotary reciprocation to the looper-shaft and looper. As has been before stated, the looper-shaft is not vertically mounted, but stands at a slight angle to a vertical line. The purpose of this construction will be understood when the fact is appreciated that it is very difficult to cause a straight needle to throw out its loop on the top. By mounting the looper shaft at an angle in the manner described the looper as it oscillates is given a slight downward movement. The needle can be caused, therefore, to throw out its loop at an angle to its path or somewhat on its side, in which position the looper can readily take it. This is accomplished by placing the needle in its holder in such a position that its eye throws out its loop in a plane which intersects at an acute angle a vertical plane passed through the needle. In other words, the horizontal needle instead of throwing its loop out on the top throws it out slightly to one side of the top. It will be seen that a looper thus mounted is confined to move in a single plane which cuts the horizontal plane containing the path of movement of the needle at an acute angle, this statement assuming, of course, that the needle is arranged, as in the present construction, to move in a substantially horizontal plane. A stitch-forming mechanism in which the stitch-forming device which coöperates with the needle is confined to move in a single plane which cuts a horizontal plane containing the path of movement of the needle at an acute angle is not, however, claimed in this case, the same being claimed in my application, Serial No. 696,983, filed November 21, 1898, of which application, as has been before stated, the present application is a division.

Figures 11, 12:
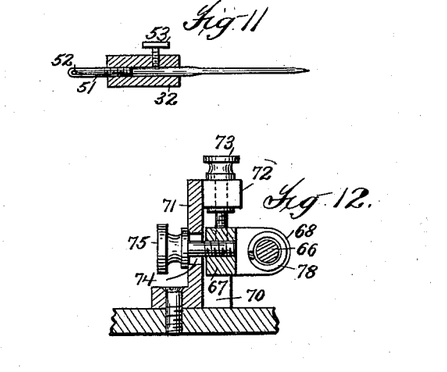
Fig. 11 is a sectional detail showing the manner of mounting the needle.
Fig. 12 is a sectional detail showing the means for adjusting the presser-foot.

As has been before stated, the needle is carried by the arm 32 of the bracket, which is mounted on the needle-bar. This bracket has a threaded perforation into which is screwed a pin 51. This pin has a perforation 52, which serves as a thread-guide. Its inner end serves as a back-stop for the needle, the needle being held in position by a set-screw 53. (See Fig. 11.) In all sewing-machines adjustment of the needle is necessary. By the construction just described I obtain a fine and easily-determinable adjustment. The pin 51 can be screwed in or out to the amount required to give the adjustment and left in that position. Should it become necessary to replace the needle, either because of breakage or for any other reason, the old needle can be taken out and a new one substituted without any experiments in order to determine its correct position.

The thread is led from a spool mounted on the usual spool-support 2 through the usual eye over a tension device 54, which is or may be of any ordinary construction. From the tension device the thread is led through the eye 55 in a bar 56. This bar 56 is mounted in a rotary stud 57, it being held in position by a set-screw 58. The rotary stud 57 finds its bearing in a bracket 59, which is secured by screws 60 to the carrier 5. From the eye 56 the thread is led through an eye 61 in a small bar or plate 62, which is preferably mounted on the projection 34 of the needle-bar bracket. From the eye 61 and plate 62 the thread is led through a perforation in a threaded plug 63, which is secured to the end of the needle-bar. From the perforation in the plug 63 the thread passes through the eye 52 and thence to the eye of the needle. Assuming the parts to be in the position shown in Fig. 1—that is, with the needle-bar in its extreme outward position and the looper holding the loop formed by the needle on the preceding stitch-forming movement—as the needle-bar starts inward the thread-controlling plate 62 moving with it takes care of the slack which would otherwise form between the eye 55 in the bar 56 and the perforation in the end of the needle-bar. No change occurs in the action on the thread until the needle reaches the goods, and up to this point the movement of the plate 62 is practically a purely slack-thread-controlling movement, as the difference in distance between the eye in the plate 62 and the eye 55 is so small as to be practically neglected. As the needle enters the goods a little slack is formed near the eye of the needle, and this slack is taken up by the further inward movement of the needle and also by the movement of the plate 62, for by the time the needle has reached the position where it has passed through the loop held by the looper the plate 62 has reached a point where the distance between its eye and the eye 55 is appreciably greater than it was when the parts were in their first position. The plate 62 therefore has begun to pull on the thread, and consequently draws back through the eye of the needle a part of the slack, which was before referred to as formed around the eye when the needle reached the goods, the rest of the slack being taken up by the further inward movement of the needle. As the needle passes through the loop held by the looper the looper casts the loop off on it. The needle now continues its advance, and the slack formed by the cast loop is taken up by the needle and by the plate 62. In other words the needle-bar and the plate 62 now begin to set the preceding stitch, and this stitch-setting action of the plate 62 and the needle-bar is continued until the needle and the plate reach their extreme inward position. At this time the eye in the plate 62 has drawn back through the needle-eye a part of the slack formed by the cast loop, and nearly all the remainder of this slack has been taken up by the inward movement of the needle. This continued action of the needle and plate has therefore nearly set the preceding stitch. As the needle starts back it throws a new loop, which is immediately picked up by the looper, and at the same time slack begins to be formed between the plate 62 and the eye 55. This slack is, however, drawn forward through the eye of the needle by the forward movement of the looper. When the needle in its backward movement and the plate 62 reach on their return movement about the point before referred to as the point where the plate 62 began its take-up action, the plate 62 ceases to give up slack, and for the rest of the movement of the plate 62 and the needle-bar they exercise a pull on the thread which is held by the looper and the tension. This pull of the bar 62 and the needle-bar operates in the first instance to draw tight the preceding stitch and then to reeve off from the spool through the tension the thread which is to form the next stitch. The needle-bar and plate 62 begin their take-up action on the inward movement of the needle-bar and complete it on the outward movement. By this construction any sudden pull or whip on the thread is avoided, and the danger of breakage from this cause is obviated. Furthermore, by this construction I am enabled to readily provide for any changes in adjustment which may be desired. Should it be desired, for instance, to decrease the amount of thread taken up, the set-screw 58 is loosened and the bar 56 is drawn forward and at the same time is turned upward, the stud 57 permitting this movement. The screw is then tightened and secures the bar in position and also locks the stud from further rotary movement. The bar is adjusted, however, as before, so that its eye 55 is in the same vertical line as the eye in the thread-controlling plate. When the bar has been thus elevated, it will be seen that the distance between the eye 55 in the bar 56 and the eye in the plate 62 when the needle is in its inward position more nearly approximates the length of the vertical line between the two eyes than when the bar is in the upward position. Since, however, the amount of thread taken up is measured by the difference in length of these two lines, it will be understood that less thread will be taken up than before the adjustment was made. Should, on the contrary, it be desired to increase the amount of thread taken up, the bar 56 is pulled outward and turned downward. This movement shortens the distance between the two eyes when the needle is in its inward position, thereby considerably increasing the amount of thread taken up, the increase being determined by the amount of movement of the bar.

Figure 14:
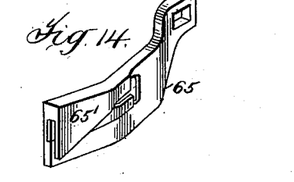
Fig. 14 is a detached view of the presser-foot.
Figure 15:
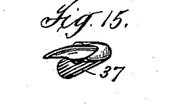
Fig. 15 is a perspective view of the looper.
Figure 16:
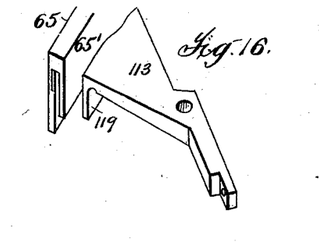
Fig. 16 is a detail view of a modification of one of the work-guides which is used when it is desired to insert a reed between the sweat-leather and body of a hat.

The work is clamped in position against the needle-plate 64 by means of a presser-foot 65, which is carried in the present machine by a longitudinally-moving rod or bar 66. This bar 66 is mounted in a block 67, having two projections 68 69, which are provided with longitudinal perforations. The block 67 is guided between shoulders 70 on a bracket 71, which is secured to the bed-plate of the machine. The bracket 71 (see Fig. 12) is provided with an overhanging projection 72, in which is mounted a screw 73, which engages a threaded perforation in the block 67. The block 67, and consequently the bar 66 and the presser-foot carried thereby, is vertically adjusted in either direction by operating the screw 73. The bracket 71 is provided with apertures 74, through which pass screws 75. The apertures 74 are considerably larger than the shanks of the screws, but are smaller than the heads thereof. In order to adjust the block 67 vertically, as before described, it is first necessary to loosen the screws 75, and after the desired adjustment has been made the bar is held firmly in adjusted position by turning the screws until the heads seat themselves firmly against the bracket 71. The presser-foot is thrown forward by means of a presser-foot lever 76, which is secured to the side of the presser-foot bar 66 by means of a screw 77 or in any other convenient way. The inner end of the lever 76 acts as a cam against the projection 77 to throw the bar 66 and presser-foot forward. The presser-foot and bar are returned by means of a spring 78, which is seated between the projection 77 and a pin passing through the bar. The presser-foot 65 is shown in detail in Fig. 14. It will be seen that it is provided with an overhanging lip 65', forming between it and the foot a guide, the function of which will be hereinafter stated.

Figures 6, 6A:
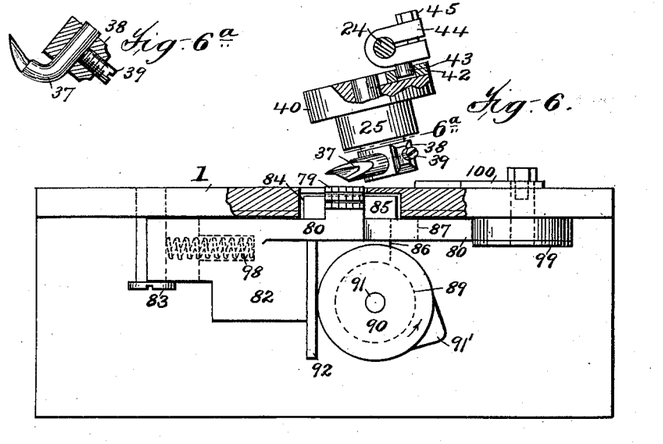
Fig. 6 is a detail front view, partly in section, showing the manner of mounting the looper.
Figure 7:
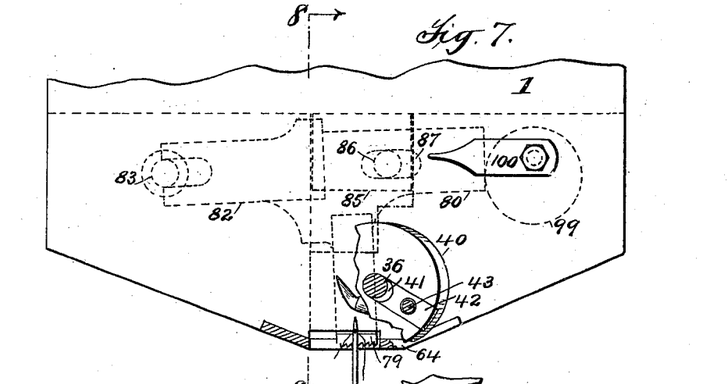
Fig. 7 is a plan view of the construction shown in Fig. 6 with the looper-operating bar and block removed.

The work is fed forward by a serrated dog 79, formed on the end of the plate or bar 80, extending rearwardly from the dog, this bar being supported at its forward end by a web 81, secured to the under side of the bed-plate in any usual manner. The bar 80, which is shown as having a slightly offset portion, (see Figs. 6 to 8, inclusive,) rests upon and is secured to a casting 82, which is slotted at one end and supported by a screw 83, which finds its bearing in the bed-plate. The bed-plate is provided with ways 84, and in these ways moves a block 85. This block has a downwardly-depending stud or pin 86, which passes through a slot 87, (clearly shown in dotted lines in plan view, Fig. 7,) the construction being such that when the plate 85 is moved forward and back in its ways the casting 82 will move therewith, carrying with it the feed-dog, which is secured to it. The slot 87, however, permits the casting to have an endwise reciprocation independently of the block. The pin 86 engages a cam-groove 89 in a roll 90, which is mounted on a cam-shaft 91, lying underneath the bed-plate. The roll 90 is also provided with a cam projection 91, which acts against a bearing-plate 92, which is secured to the casting. The shaft 91 is geared to a vertical shaft 93 by a pair of miter-gears 94 95. The shaft 93 at its upper end carries another miter-gear 96, which meshes with a miter-gear 97 on shaft 16. As shaft 91 is revolved through the connections just described it will be seen that the feed-dog 79 will be given its reciprocation toward and from the work by means of the stud 86, which engages with the cam-groove 89. The engagement of the pin 86 with the cam-groove 89 causes the casting 82 to have a pivotal movement on the stud 83; but the radius in which the dog moves is so long that this circular movement can practically be disregarded, and the action is substantially the same as though the block 82 and the dog had a reciprocation in a right line toward and from the work. The feeding movement of the dog is caused by contact of the cam projection 91 with the cam-plate 92. This engagement causes casting 82 and the dog to move toward the stud 83, thus moving the work forward. The return movement of the dog is produced by means of a spring 98. The amount of movement of the feed-dog, and consequently the length of the stitch, is controlled by a back-stop cam 99, which is operated by a short lever 100, which lies on top of the bed-plate, this being a usual construction.

Figure 13:
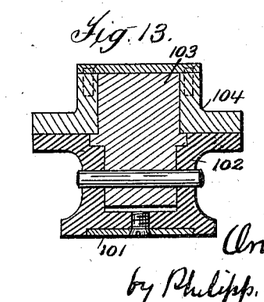
Fig. 13 is a sectional detail plan view on the line 13 of Fig. 2 and looking in the direction of the arrow, this view illustrating the manner of mounting the main work-guide.

For sewing certain classes of goods, and particularly in sewing the sweat-leathers in hats or the upturned bottoms of trousers, it is necessary to provide a work-guide, the office and function of which are not only to properly present the work to the stitch-forming devices, but also to retain it in proper form. The guide which I prefer to employ is that shown, described, and claimed in my Patent No. 653,630, granted July 10, 1900, to which patent reference is made for a full description of the guide. For the purposes of this application, however, it is sufficient to say that this guide 101 is secured to a block 102, this block being pivoted to a sliding block 103. The sliding block 103 is moved between ways 104, which are secured to a casting 105, the casting 105 being secured to a depending flange 106 on the bed-plate or fastened to it in any suitable manner. The block 103 is forced upward by a spring 107, which bears at its upper end against the block and its lower end against a web, connecting the ways or guides 104. The upward movement of the block is limited by a stop-screw 108, passing through a threaded aperture in the web at the upper end of the ways, a check-nut 109 being provided to hold the screw in position. The guides 104 are provided with wings or sidewise projections 110, and the block 102 is formed so that the flat faces of its sides bear against these wings. (See Figs. 1 and 13.) The lower ends of these wings 110 are chamfered off, as shown at 111, Fig. 1. When the work-holder 101 is forced downward, it carries with it the blocks 102 and 103, the block 103 being vertically guided, as before stated, in the ways 104. When these blocks have been moved downward sufficiently far to permit the work to be placed on or removed from the guide, as the case may be, the block 102 is swung forward on its pivot. At this time its inner flat sides or faces are partly below the ends of the wings 110, and these flat sides, coming in contact with the chamfers 111, lock the block and its attached guide in the downward position, so that the work can readily be placed on the guide. In order to permit the guide to swing forward, the block 103 is also provided with chamfers 112, which allow the guide and block 102 to be swung forward slightly, the parts taking the position shown in dotted lines in Fig. 1. The work having been placed in position on the guide, the guide is swung backward and is moved up by the spring 107 into proper position to present the work to the needle. In order to prevent the work from riding upward off the work-guide, I preferably provide a pair of pivoted guides or stops 113 114, which act on the top of the work above the guide 101. These stops are normally forced upward by springs 115 116, the upward movement being controlled by stop-screws 117 118, which engage threaded apertures in the bed-plate. These stops or guides bearing against the upper edge of the work overcome any tendency toward vertical movement, which is sometimes induced by the action of the needle or from other causes.

In sewing sweat-leathers in hats it is sometimes considered desirable to introduce between the sweat-leather and the body of the hat a covered reed. When this is done, the guide 113 is provided with a groove 119, through which the reed is fed in position to be properly secured by the stitch-forming mechanism.

Figure 8:
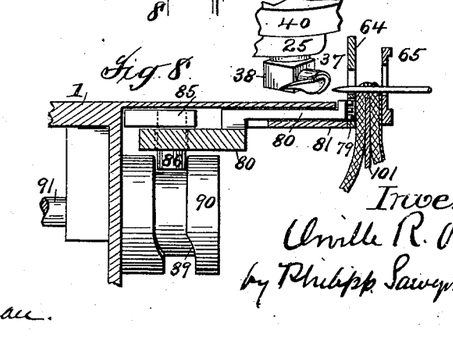
Fig. 8 is a sectional detail view taken on the line 8 of Fig. 7 and looking in the direction of the arrow, the goods to be sewed being shown in position between the needle-plate and the presser-foot and supported by the guide.
Figure 9:
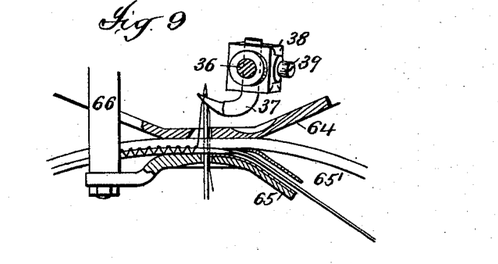
Fig. 9 is a sectional detail plan view of a portion of the devices shown in Fig. 8, but the needle being threaded and the looper in the act of taking the loop from the needle.
Figure 10:
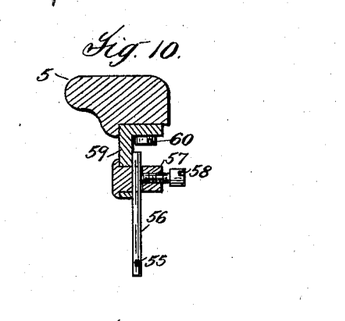
Fig. 10 is a sectional detail showing the construction by which the take-up is adjusted.

Assuming that the machine which has been selected for the purpose of illustrating the invention is arranged to sew the sweat-leathers in hats by a blind zigzag stitch, and the construction has been described with particular reference to this work, the operation of the machine is as follows: The work-guide 101 having been pushed down and rocked forward on its pivot the flat sides of the carrying-block come in contact with the chamfers 111 of the wings 105 and lock it in its lowered position. A hat is now placed in position on the work-guide, the crown of the hat resting against the concave inner side of the guide and the brim being folded over the edge and lying on the other side. The presser-foot has been thrown forward by the operation of the cam-lever 76. The work-guide is now rocked backward, and the spring 107 forces the hat into proper position to be operated upon by the stitch-forming mechanism. The presser-foot is now released and clamps the work between itself and the needle-plate, as shown in Fig. 8. The end of the sweat-leather is now introduced in the groove in the presser-foot formed by the overhanging lip 65'. The machine being now set into operation the needle passes through the hat-brim and the sweat-leather and on its return stroke throws out the loop, which is caught by the looper in the usual manner. When the needle has reached the end of its outward stroke, the cam 15 operates through the lever 9 to raise the carrier 5 and the stitch-forming mechanism, the work being held in position by the presser-foot and being also additionally held from rising by the guides or stops 113. When the carrier has been lifted, the needle makes a second inward stroke, passing over the top of the work. As it moves inward the plate 62, in connection with the eye in the bar 56, operates to draw in the slack which was formed by the outward movement of the needle-bar and the needle passes through the loop held by the looper, the backward movement of the looper depositing the loop on the needle. As the needle returns on its outward stroke the looper moves forward and catches the new loop thrown out from the needle, drawing it through the other loops and completing the stitch, which is formed above the work. At the same time the stitch is drawn tight by the outward movement of the needle-bar and sufficient thread is pulled off the tension device to form the succeeding stitch. The cam 15 now operates through the connections before described to lower the carrier 5, and as the needle next comes inward it passes through the goods and repeats the stitch-forming operations before described. It will be seen, therefore, that in the machine arranged as shown one stitch is formed through the work and the next stitch is formed above the work. To effect this result in the machine shown, the gear 18 on the main shaft makes two revolutions for each revolution of the gear 17, and the machine thus makes two stitches for each complete reciprocation of the carrier 5—that is to say, one stitch is formed when the carrier is lowered and one when it is raised—thus forming what is commercially known as a "zigzag" blind stitch.

Should it be desired to utilize the machine for making what is commercially known as a "whip-stitch," the gears 17 and 18 and the cams 15 are removed and other gears and a cam substituted therefor. These gears are so related to each other that the gear on the main shaft makes three revolutions while the gear on the cam-shaft makes one revolution. The configuration of the new cam is such that it raises and holds the carrier elevated while two stitches are being made above the work and then lowers it and holds it dropped while one stitch is being formed. It is obvious that by changing the relation of the gears and the operation of the cams any form of stitch desired may be produced.

It is obvious that certain parts of the invention are capable of use independent of the other parts, and it is to be understood that such independent use is contemplated. It is further understood that while the invention is particularly adapted for the specific uses which have been set forth in the earlier portion of this specification it is not to be considered as confined to those uses, as the invention and the machine embodying the same are capable of use for many purposes. It is furthermore obvious that many changes may be made in the specific construction by which the invention is carried into effect, and such changes will readily suggest themselves to skilled mechanics. The invention is therefore to be regarded as generic in its nature and is not to be limited to the particular details of construction shown in the drawings and described in the foregoing specification.

What I claim is—

1. In a sewing-machine, the combination with a bed-plate, of means for supporting the work at an angle to the bed-plate, a straight needle, means for supporting and operating it in a plane which is substantially parallel to the bed-plate, devices coöperating with the needle to form a stitch, and means for giving the needle and coöperating stitch-forming devices a bodily movement at an angle to the line of reciprocation of the needle, substantially as described.

2. In a sewing-machine, the combination with a straight needle, of means for supporting and operating it in a substantially horizontal plane, devices coöperating with the needle to form a stitch, means for supporting the work in a substantially vertical plane, and means for giving the needle and the coöperating stitch-forming devices intermittent vertical movement, substantially as described.

3. In a stitch-forming mechanism, the combination with a needle reciprocating in a substantially horizontal plane and mounted to throw out its loop in a plane which cuts the horizontal plane containing the path of the needle at an acute angle, and a coöperating stitch-forming device, substantially as described.

4. In a stitch-forming mechanism, the combination with a needle reciprocating in substantially a horizontal plane and mounted to throw out its loop in a plane which cuts the horizontal plane containing the path of the needle at an acute angle, of a coöperating stitch-forming device moving in a curved path, substantially as described.

5. In a stitch-forming mechanism, the combination with a needle reciprocating in a substantially horizontal plane and mounted to throw out its loop in a plane which cuts the horizontal plane containing the path of the needle at an acute angle, of an oscillating looper moving in a curved path, substantially as described.

6. In a sewing machine, the combination with the bed, of a reciprocating needle and means for supporting and operating it, the needle being mounted to throw out its loop in a plane cutting at an acute angle a plane which contains the path of the needle and which is substantially parallel to the bed, and coöperating stitch-forming devices, substantially as described.

7. The combination with a frame or support, of a carrier movable therein, means for giving an intermittent movement to the carrier, a needle-bar carried by the carrier, a coöperating stitch-forming device also carried by the carrier, said stitch-forming device in the stitch-forming operation moving in a path which is contained in a plane cutting the path of movement of the carrier at an acute angle, substantially as described.

8. The combination with a frame or support, of a carrier movable therein, means for giving an intermittent movement to the carrier, a needle-bar carried by the carrier, and a looper also carried by the carrier and moving in a path which is contained in a plane cutting the path of movement of the carrier at an acute angle, substantially as described.

9. In a stitch-forming mechanism, the combination with a frame or support, of a carrier, means for giving the carrier intermittent vertical movement, a needle supported in the carrier, a shaft, a coöperating stitch-forming device mounted thereon, said shaft standing at an angle to the movement of the carrier which is other than a right angle, and means for operating the shaft and needle to cause the stitch-forming device and needle to form a stitch, substantially as described.

10. In a stitch-forming mechanism, the combination with a frame or support, of a carrier, means for giving the carrier intermittent movements, a needle-bar supported in the carrier, and reciprocating at an angle to the movement of the carrier, a straight needle carried thereby, a coöperating stitch-forming device, a shaft on which the coöperating stitch-forming device is mounted, said shaft standing at an angle to the movement of the carrier which is other than a right angle, and means for operating the stitch-forming device and the needle to form a stitch, substantially as described.

11. In a stitch-forming mechanism, the combination with a support having a bearing therein, of a reciprocating needle-bar moving in said bearing, a bracket on the bar to which the needle is connected, and means independent of the needle-bar whereby the needle-carrying bracket is kept from turning with respect to the bar as the bar reciprocates, substantially as described.

12. In a stitch-forming mechanism, the combination of a support having a bearing therein, a reciprocating needle-bar moving in said bearing, a bracket on the needle-bar to which the needle is connected, and a guide-and-slot connection between the bracket and the bearing whereby the needle-carrying bracket is guided in its movements, substantially as described.

13. In a stitch-forming mechanism, the combination with a carrier having a supporting-bearing, of a needle-bar working in the bearing and carrying a needle, a shaft mounted on the carrier, said shaft carrying a coöperating stitch-forming device, means for moving the carrier, and means for operating the needle-bar and shaft, substantially as described.

14. In a stitch-forming mechanism, the combination with a carrier and the means for moving it, of a supporting-bearing, a needle-bar working in the bearing and carrying the needle, a shaft mounted on the carrier, a coöperating stitch-forming device mounted on the shaft, a reciprocating rod also moving in a bearing in the support, and connections between said rod and the shaft, substantially as described.

15. In a stitch-forming mechanism, the combination with a support, of a looper-shaft mounted therein, a reciprocating rod, suitable bearings therefor, a slotted disk on the looper-shaft, a block located in the slot in the disk, and connections between the reciprocating rod and the block whereby the reciprocating motion of the rod is converted into a rotary motion of the looper, substantially as described.

16. In a stitch-forming mechanism, the combination with a reciprocating rod moving in suitable bearings, of a looper-shaft supported in suitable bearings and standing at an angle to the line of reciprocation of the rod, a slotted disk on said looper-shaft, a block mounted in the slot, and a connection between the rod and the block, said connection being angularly adjustable around the rod, substantially as described.

17. In a stitch-forming mechanism, the combination with a reciprocating rod moving in suitable bearings, of a looper-shaft mounted in suitable bearings and standing at an angle to the line of reciprocation of the rod, a slotted disk on the looper-shaft, a block mounted in the slot, and a connection between the rod and block, said connection being longitudinally adjustable along the rod, substantially as described.

18. The combination with a reciprocating carrier, of a reciprocating rod working in bearings therein, a looper-shaft standing at an angle to the movement of the carrier which is other than a right angle, a slotted disk on said looper-shaft, a block in the slot, an adjustable connection between the reciprocating rod and the block, and a needle-bar carried by said carrier, substantially as described.

19. The combination with a frame or support, of a carrier mounted therein, means for giving the carrier intermittent reciprocating movement, a needle-bar reciprocating in said carrier, a straight needle carried by the bar, a shaft mounted in the carrier, a coöperating stitch-forming device mounted on the shaft, and means for operating the shaft, substantially as described.

20. The combination with a frame or support, of a carrier mounted therein, means for giving the carrier intermittent reciprocating movements, a needle-bar reciprocating in bearings in said carrier, a straight needle carried by said bar, a looper-shaft mounted in said carrier, a reciprocating rod working in bearings in the carrier, and connections between the rod and the looper-shaft, substantially as described.

21. In a sewing-machine, the combination with a thread-supply, of a needle-bar, a thread-guide between the thread-supply and bar, a thread-controlling device between the guide and the bar, means for giving the thread-controlling device a movement which is parallel to the movement of the bar, and coöperating stitch-forming devices, the parts being constructed and arranged so that the needle-bar draws the thread from the supply on its outward stroke and slack is taken up on its inward stroke, substantially as described.

22. In a sewing-machine, the combination with a reciprocating needle-bar carrying a needle, of a thread-supply, a thread-guide located between the thread-supply and the bar, and a thread-controlling device carried by the bar and operating to take up the slack on the inward stroke of the bar, substantially as described.

23. In a sewing-machine, the combination with a thread-controlling device moving in a right line, of a thread-guide for delivering the thread thereto, and means for varying the distance between the thread-guide and the thread-controlling device, substantially as described.

24. In a sewing-machine, the combination with a reciprocating needle-bar, of a thread-controlling plate having a movement parallel with the bar, a thread-guide from which the thread is led to the thread-controlling plate, and a moving thread-guide to which the thread is led from the controlling-plate, substantially as described.

25. In a sewing-machine, the combination with a reciprocating needle-bar, of a thread-controlling plate having a right-line movement parallel with the bar, a thread-guide from which the thread is led to the thread-controlling plate, and means for varying the distance between the guide and the thread-controlling plate, substantially as described.

26. In a sewing-machine, the combination with a support, of a rotary stud mounted therein, of a bar having a thread-guiding eye therein mounted on the stud and adjustable radially with respect to the axis of the stud, substantially as described.

27. In a sewing-machine, the combination with a bracket, of a rotary stud mounted therein, a bar having a thread-guiding eye therein mounted in the stud and adjustable radially with respect to the axis of the stud, and a single screw for controlling both adjustments, substantially as described.

28. In a sewing-machine the combination with a carrier of a reciprocating needle-bar mounted therein, a needle-supporting bracket mounted on the bar, means for securing the needle to the bracket in a position parallel to the bar and so that a line drawn from any point in the needle and at right angles to its axis will intersect the bar, and means for giving the carrier a movement at an angle to the reciprocating movement of the bar, substantially as described.

29. In a sewing-machine, the combination with a carrier of a horizontally-reciprocating needle-bar mounted therein, a needle-supporting bracket mounted on the bar, means for securing the needle to the bracket in a position parallel to the bar and so that a line drawn from any point in the needle and at right angles to its axis will intersect the bar, and means for giving the carrier a movement at an angle to the reciprocating movement of the bar, substantially as described.

30. In a sewing-machine, the combination with a carrier of a horizontally-reciprocating needle-bar mounted therein, a needle-supporting bracket mounted on the bar, means for adjustably securing the needle to the bracket in a position parallel to the bar and so that a line drawn from any point in the needle and at right angles to its axis will intersect the bar, and means for giving the carrier a movement at an angle to the reciprocating movement of the bar, substantially as described.

31. In a sewing-machine, the combination of a carrier with a reciprocating needle-bar supported in the carrier, needle-supporting means at the outer end of the bar operating to support the needle with its point toward the inner end of the bar, operating mechanism for the bar connected to its inner end and means for giving the carrier a movement at an angle to the movement of the bar, substantially as described.

32. In a sewing-machine, the combination of a carrier with a horizontally-reciprocating needle-bar supported in the carrier, needle-supporting means at the outer end of the bar operating to support the needle with its point toward the inner end of the bar, operating mechanism for the bar connected to its inner end and means for giving the carrier a movement at an angle to the movement of the bar, substantially as described.

33. In a sewing-machine, the combination with a bed-plate, of means for supporting and feeding the work at an angle to the bed-plate, a needle-bar, devices on the bar for supporting the needle, means for causing the bar when forming a stitch to reciprocate across the line of feed, a carrier for the bar, means for giving the carrier a movement at an angle to the movement of the bar, and coöperating stitch-forming devices, substantially as described.

34. In a sewing-machine, the combination with a bed-plate, of a feeding mechanism operating in a plane parallel to the bed-plate, means for supporting the work at an angle to the bed-plate, a needle-bar, devices thereon for supporting the needle, means for reciprocating the bar across the line of feed, a carrier for the bar, means for giving the carrier a movement at an angle to the movement of the bar, and coöperating stitch-forming devices, substantially as described.

35. In a sewing-machine, the combination with a presser-foot, of a carrier therefor, means whereby the carrier and foot are operated to clamp and release the work, and means for giving the carrier and foot a bodily adjustment in a direction at an angle to the line in which they move to clamp the work, substantially as described.

36. In a sewing-machine, the combination with a presser-foot, of a bar by which the foot is carried, means for operating the bar to cause the foot to clamp and release the work, and means for giving the bar and foot adjustment in a line at right angles to their line of movement in clamping the work, substantially as described.

37. In a sewing-machine, the combination with a presser-foot, of a bar by which the foot is carried, means for operating the bar to clamp and release the work, a block having a bearing in which the bar moves, and means for adjusting the block, substantially as described.

38. In a sewing-machine, the combination with a feeding mechanism, of a stitch-forming mechanism working across the line of feed, and a pair of adjustable stops one of which is located on each side of the path of travel of the stitch-forming mechanism and extending over the line of feed, substantially as described.

39. In a machine for sewing sweat-leathers in hats, the combination with a feeding mechanism, of a stitch-forming mechanism operating across the line of feed, a presser-foot for holding the work in position, and a guide in the presser-foot through which the sweat-leather is fed to the hat, substantially as described.

40. In a machine for sewing sweat-leathers in hats, the combination with a feeding mechanism, of a stitch-forming mechanism operating across the line of feed, a presser-foot for holding the work in position having a guide through which the sweat-leather is fed to the hat, and a curved guide over which the brim of the hat is folded, substantially as described.

41. In a sewing-machine, the combination with a frame having an overhanging arm, of guides in the outer end of the arm, a carrier located in the guides, a needle-bar supported in the carrier, a looper supported in the carrier, a reciprocating rod for operating the looper, connections between the rod and the looper, needle-bar-operating mechanism including a link connection extending from the inner end of the needle-bar, looper-operating mechanism including a link connection extending from the inner end of the looper-operating rod, and devices for intermittently raising and lowering the carrier, substantially as described.

42. In a sewing-machine, the combination with a frame having an overhanging arm, of guides in the outer end of the arm, a carrier working in the guides, means for intermittently moving the carrier, a needle-bar supported in the carrier, looper mechanism supported in the carrier, means for operating the looper, and means for operating the needle-bar including a link connection extending from the inner end of the bar, substantially as described.

43. In a sewing-machine, the combination with a frame having an overhanging arm, of guides mounted in the outer end of the arm, a carrier mounted in the guides, means for intermittently moving the carrier, a stitch-forming mechanism including a horizontally-reciprocating needle-bar supported in the carrier and carrying a straight needle, suitable devices for operating the stitch-forming mechanism, and a feeding mechanism operating to feed the work across the path of reciprocation of the needle-bar, substantially as described.

44. In a sewing-machine, the combination with a frame, of a carrier, guides in which the carrier is mounted, a stitch-forming mechanism supported in the carrier, a lever by which the carrier is raised and lowered, and means for changing the fulcrum-point of the lever, substantially as described.

45. In an organized machine for sewing sweat-leathers in hats, the combination with a guide over which the edge of the hat is folded, a feed for feeding the work along the guide, a presser-foot for holding the work in position having a guide therein for directing the sweat-leather into proper position to be secured to the hat, an adjustable stop lying across the line of feed to prevent the work from rising, a guide in said stop for guiding a reed between the leather and the hat, and a stitch-forming mechanism operating across the line of feed, substantially as described.

In testimony whereof I have hereunto set my hand in the presence of two subscribing witnesses.

ORVILLE R. VAN VECHTEN.

Witnesses:
   A. WHITE,
   A. A. V. BOURKE.